(12) United States Patent
Shi

(10) Patent No.: US 10,754,484 B2
(45) Date of Patent: Aug. 25, 2020

(54) TOUCH PANEL, MANUFACTURING METHOD FOR TOUCH PANEL AND TOUCH DEVICE

(71) Applicant: Wuhan China Star Optoelectronics Semiconductor Display Technology Co., Ltd., Wuhan, Hubei (CN)

(72) Inventor: Wenjie Shi, Guangdong (CN)

(73) Assignee: WUHAN CHINA STAR OPTOELECTRONICS SEMICONDUCTOR DISPLAY TECHNOLOGY CO., LTD., Wuhan, Hubei (CN)

( * ) Notice: Subject to any disclaimer, the term of this patent is extended or adjusted under 35 U.S.C. 154(b) by 57 days.

(21) Appl. No.: 16/086,806

(22) PCT Filed: Jul. 5, 2018

(86) PCT No.: PCT/CN2018/094667
§ 371 (c)(1),
(2) Date: Sep. 20, 2018

(87) PCT Pub. No.: WO2019/227594
PCT Pub. Date: Dec. 5, 2019

(65) Prior Publication Data
US 2019/0369810 A1    Dec. 5, 2019

(30) Foreign Application Priority Data

May 30, 2018    (CN) .......................... 2018 1 0537492

(51) Int. Cl.
*G06F 3/044* (2006.01)
(52) U.S. Cl.
CPC .......... *G06F 3/0445* (2019.05); *G06F 3/0446* (2019.05); *G06F 2203/04103* (2013.01); *G06F 2203/04111* (2013.01)

(58) Field of Classification Search
CPC ................ G06F 3/0445; G06F 3/0446; G06F 2203/04103; G06F 2203/04111
See application file for complete search history.

(56) References Cited

U.S. PATENT DOCUMENTS

2014/0176490 A1 * 6/2014 Zhou ..................... G06F 3/0412
                                                     345/174
2017/0052615 A1 * 2/2017 Cao .......................... G06F 3/044
(Continued)

FOREIGN PATENT DOCUMENTS

CN        103901650 A       7/2014
CN        204706011 U      10/2015
(Continued)

OTHER PUBLICATIONS

International search report dated Feb. 27, 2019 from corresponding application No. PCT/CN2018/094667.

*Primary Examiner* — Amare Mengistu
*Assistant Examiner* — Jennifer L Zubajlo
(74) *Attorney, Agent, or Firm* — Leong C. Lei

(57) ABSTRACT

The invention provides a touch panel, manufacturing method for touch panel and a touch device. The touch panel comprises: a substrate; a plurality of first electrode chains disposed on the substrate, spaced apart, each of the first electrode chains comprising a plurality of first electrodes; a plurality of second electrode chains disposed on the substrate, spaced apart, each of the second electrode chains comprising a plurality of second electrodes, the second electrode chains being cross-insulated from the first electrode chains; at least a conductive bridge, electrically connected to the first electrode chain, the conductive bridge extending into a contour region of the second electrode chain and insulated from the second electrode chain. The invention improves the mutual capacitance between the first (Continued)

electrode chain and the second electrode chain to provide higher touch detection accuracy.

20 Claims, 10 Drawing Sheets

(56) References Cited

U.S. PATENT DOCUMENTS

| | | |
|---|---|---|
| 2017/0147113 A1* | 5/2017 | Sun .......................... G06F 3/044 |
| 2017/0235390 A1 | 8/2017 | Dong |
| 2018/0046291 A1* | 2/2018 | Qu ........................... G06F 3/044 |

FOREIGN PATENT DOCUMENTS

| | | | | |
|---|---|---|---|---|
| CN | 105159489 A | | 12/2015 | |
| CN | 105446570 A | * | 3/2016 | ........... G06F 3/0412 |
| CN | 105446570 A | | 3/2016 | |
| CN | 107957816 A | * | 4/2018 | |
| CN | 107957816 A | | 4/2018 | |
| CN | 108170312 A | | 6/2018 | |

* cited by examiner

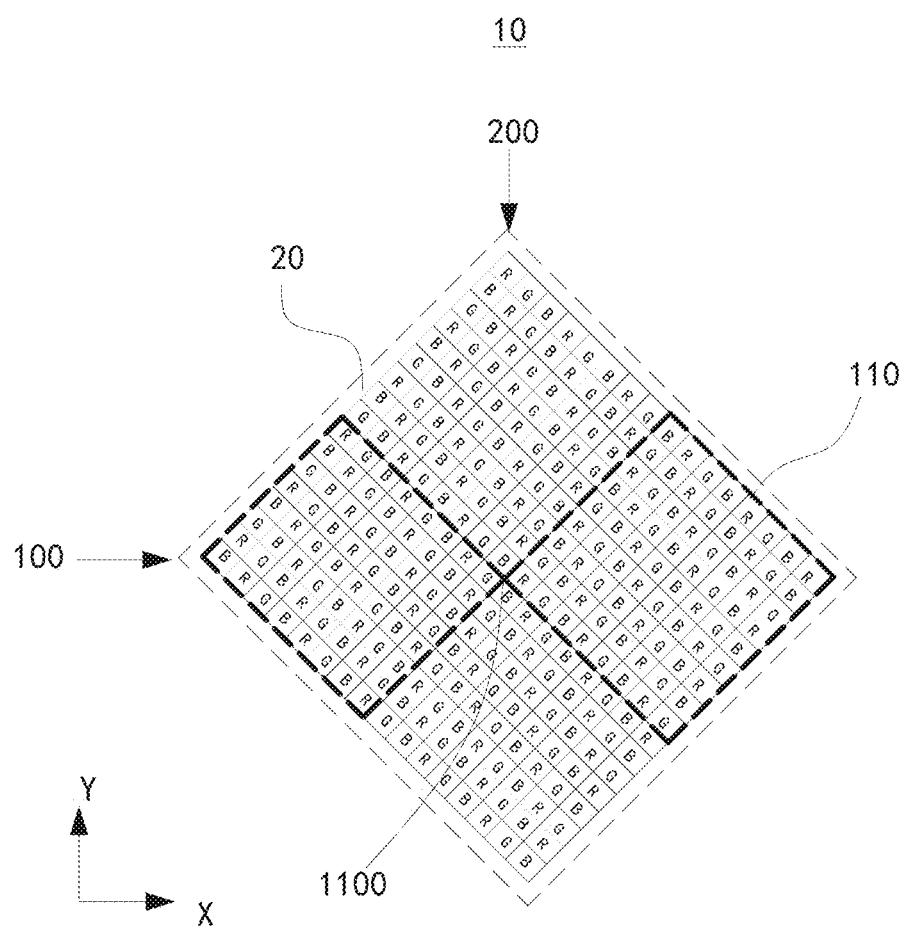
Figure 5 ( a )

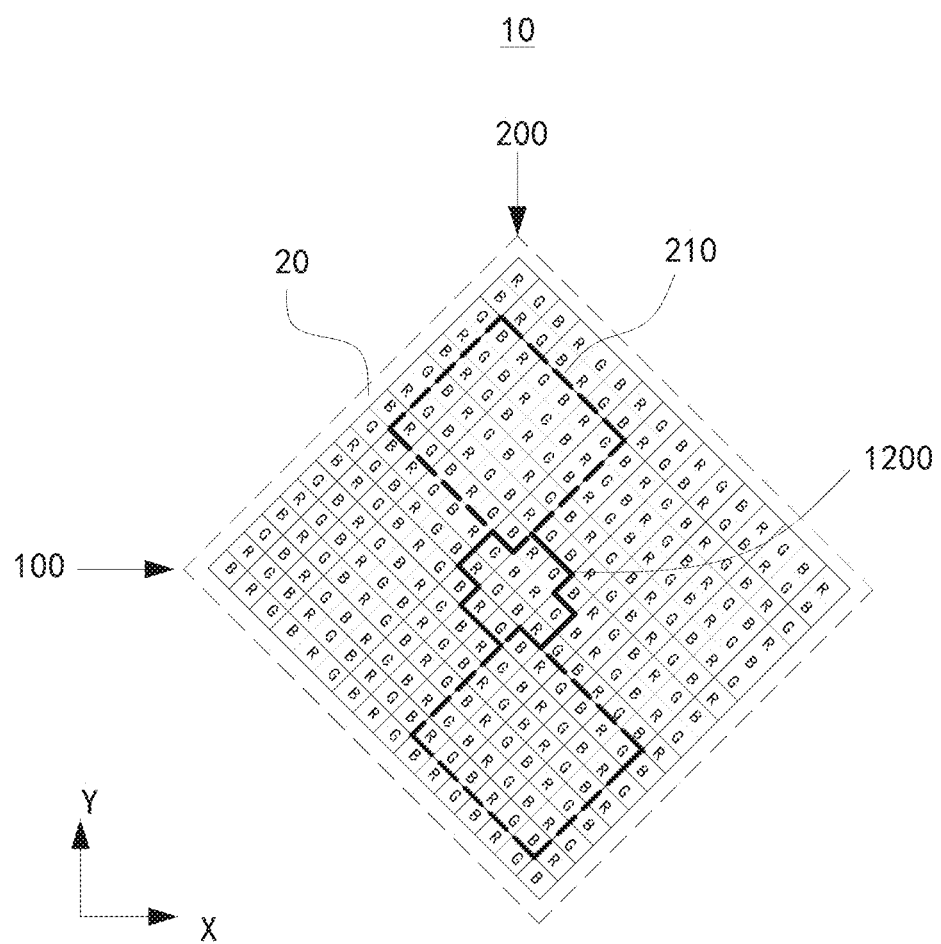
Figure 5 ( b )

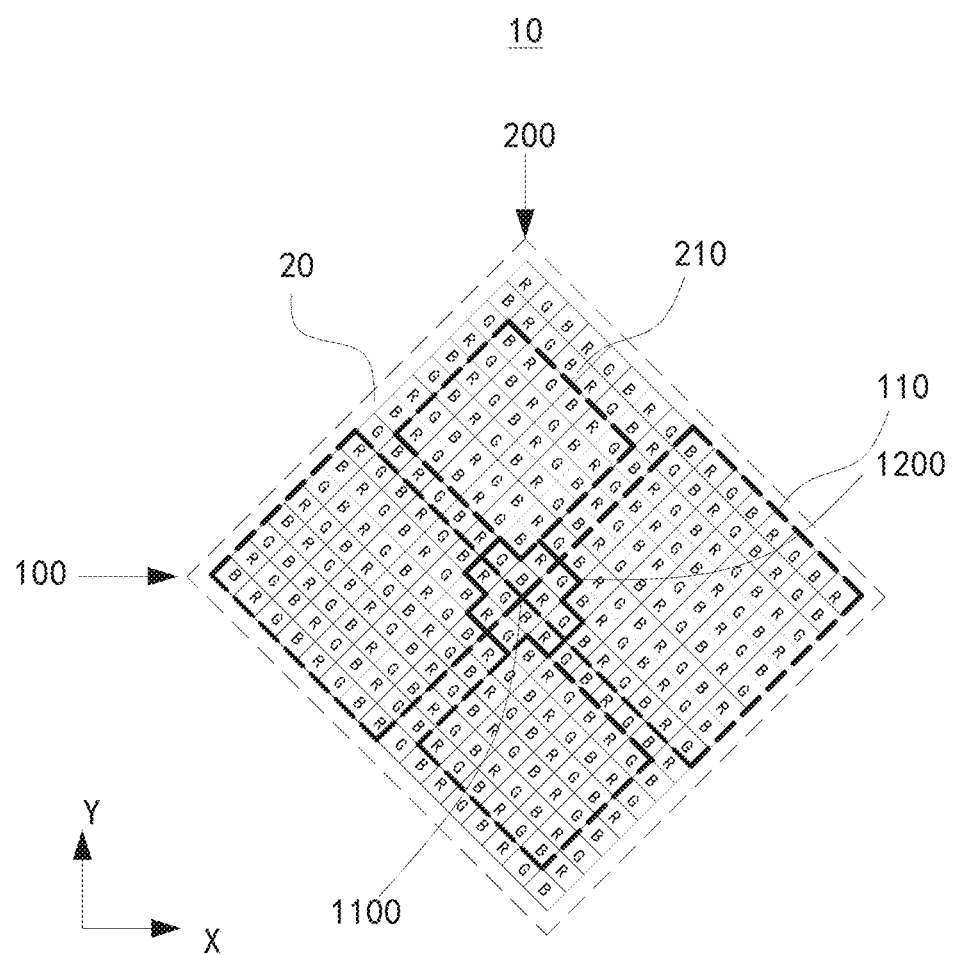
Figure 5 ( c )

TOUCH PANEL, MANUFACTURING METHOD FOR TOUCH PANEL AND TOUCH DEVICE

CROSS REFERENCE TO RELATED APPLICATIONS

This application is a National Phase of International Application Number PCT/CN2018/094667, filed Jul. 5, 2018, and claims the priority of Chinese Patent Application No. CN201810537492.6, entitled "Touch Panel, Manufacturing Method for Touch Panel and Touch Device", filed on May 30, 2018, the disclosure of which is incorporated herein by reference in its entirety.

BACKGROUND OF THE INVENTION

1. Field of the Invention

The present invention relates to the field of touch function, and in particular to the field of touch panel, manufacturing method for touch panel and touch device.

2. The Related Arts

Based on the working principle, the touch panels can be divided into two types: resistive type and capacitive type. At present, the application of the capacitive touch panel in electronic products is increasingly popular. The capacitive touch panel is operated by the current sensing of the human body, and is a touch panel that senses a touch signal by combining an electrode and a human body characteristic. When the human body (finger) contacts the touch panel, due to the electric field of the human body, a coupling capacitor is formed between the finger and the conductor layer of the touch panel, and the current generated by the electrode on the touch panel flows to the contact point, thereby being able to calculate the position of the contact point. However, in the prior art, the touch sensitivity of the touch panel is not high.

SUMMARY OF THE INVENTION

The present invention provides a touch panel, which comprises:
a substrate;
a plurality of first electrode chains disposed on the substrate, spaced apart, each of the first electrode chains comprising a plurality of first electrodes;
a plurality of second electrode chains disposed on the substrate, spaced apart, each of the second electrode chains comprising a plurality of second electrodes, the second electrode chains being cross-insulated from the first electrode chains;
at least a conductive bridge, electrically connected to the first electrode chain, the conductive bridge extending into a contour region of the second electrode chain and insulated from the second electrode chain.

The touch panel of the present invention comprises a plurality of spaced-apart first electrode chains and a plurality of spaced-apart second electrode chains, and the first electrode chain and the second electrode chain being cross-insulated, at least a conductive bridge, electrically connected to the first electrode chain, the conductive bridge extending into a contour region of the second electrode chain, and insulated from the second electrode chain. Because the conductive bridge and the first electrode chain are electrically connected, and the conductive bridge can be regarded as a part of the first electrode chain, and the conductive bridge extends into the contour region of the second electrode chain to increase the interaction area between the first electrode chain and the second electrode chain, thereby changing the mutual capacitance between the first electrode chain and the second electrode chain, and improving the sensitivity of touch detection.

The present invention also provides a manufacturing method for touch panel, which comprises:
providing a substrate;
forming a plurality of first electrode chains on the substrate, spaced apart, each of the first electrode chains comprising a plurality of first electrodes;
forming a plurality of second electrode chains on the substrate, spaced apart, each of the second electrode chains comprising a plurality of second electrodes, the second electrode chains being cross-insulated from the first electrode chains;
forming at least a conductive bridge, the conductive bridge being electrically connected to the first electrode chain, the conductive bridge extending into a contour region of the second electrode chain and insulated from the second electrode chain.

The present invention also provides a touch device. The touch device comprises the above touch panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

FIGS. 5(*a*)-5(*c*) are schematic views showing the structure of connecting portion of the touch panel according to a preferred embodiment of the present invention.

DETAILED DESCRIPTION OF THE PREFERRED EMBODIMENTS

To further explain the technical means and effect of the present invention, the following refers to embodiments and drawings for detailed description. Apparently, the described embodiments are merely some embodiments of the present invention, instead of all embodiments. All other embodiments based on embodiments in the present invention and obtained by those skilled in the art without departing from the creative work of the present invention are within the scope of the present invention.

The terms "comprising" and "having" and any variations thereof appearing in the specification, claims, and drawings of the present application are intended to cover non-exclusive inclusion. For example, a process, method, system, product, or device that includes a series of steps or units is not limited to the listed steps or units, but optionally also includes steps or units not listed, or alternatively, other steps or units inherent to these processes, methods, products or equipment. In addition, the terms "first", "second" and "third" are used to distinguish different objects, and are not intended to describe a particular order.

Figure 1:
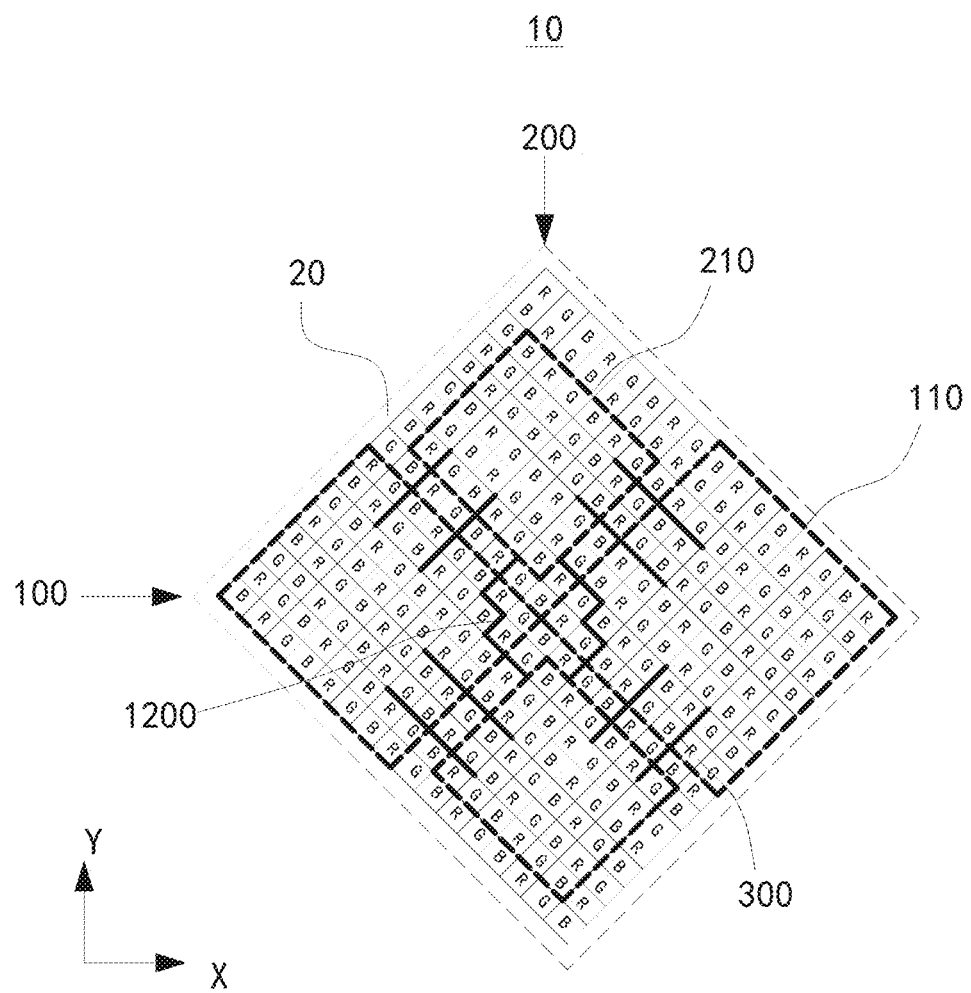
FIG. 1 is a schematic view showing the structure of the touch panel according to the first embodiment of the present invention.

As shown in FIG. 1, FIG. 1 is a schematic view showing the structure of the touch panel according to the first embodiment of the present invention. The touch panel 10 comprises:

a substrate 20;

a plurality of first electrode chains 100 disposed on the substrate 20, spaced apart, the first electrode chain 100 comprising a plurality of first electrodes 110;

a plurality of second electrode chains 200 disposed on the substrate 20, spaced apart, the second electrode chain 200 comprising a plurality of second electrodes 210, the second electrode chains 200 being cross-insulated from the first electrode chains 100:

at least a conductive bridge 300, the conductive bridge 300 being electrically connected to the first electrode chain 100, the conductive bridge 300 extending into a contour region of the second electrode chain 200 and insulated from the second electrode chain 200.

Wherein, the substrate 20 is a transparent substrate, such as, a glass substrate or a plastic substrate, and may be a flexible substrate or an encapsulation layer of the flexible display panel.

Preferably, the first electrode chain 100 is a sensing electrode chain, and the second electrode chain 200 is a driving electrode chain. In such case, the first electrode 110 is a sensing electrode and the second electrode 210 is a driving electrode. Alternatively, the first electrode chain 100 is a driving electrode chain, and the second electrode chain 200 is a sensing electrode chain. In such case, the first electrode 110 is a driving electrode and the second electrode 210 is a sensing electrode.

Wherein, the first electrode 110 and/or the second electrode 210 have a block structure made of a transparent conductive material, and the first electrode 110 and/or the second electrode 210 are both made of metal, and the touch layer formed by the first electrode chain 100 and the second electrode chain 200 is a mesh structure. The first electrode 110 and/or the second electrode 210 may be formed into various shapes, such as, a rhombic shape, a square shape, a rectangular shape, and the like, which are not limited in the present invention. In a preferred embodiment, in a case where the first electrode 110 and the second electrode 210 have a rhombic shape or a square shape, the adjacent first electrodes 110 in each of the first electrode chains 100 are electrically connected to each other at the vertices of rhombic shape or square shape in a first direction, and the adjacent second electrodes 210 of each of the second electrode chains 200 are electrically connected to each other by a bridge 2000 at the vertices of the rhombic shape or the square shape in a second direction. The first direction may be the X direction or the Y direction; the second direction may be the Y direction or the X direction. When the first direction is the X direction, the second direction is the Y direction; when the first direction is the Y direction, the second direction is the X direction.

Optionally, in an embodiment, the touch panel 10 further comprises:

a barrier layer Z (not shown), the barrier layer Z is disposed between the substrate 20 and the first electrode chain 100, the second electrode chain 200;

a pixel layer S (not shown) disposed between the barrier layer Z and the substrate 20, the pixel layer S comprises a red pixel S10, a green pixel S20, and a blue pixel S30, the conductive bridge 300 is disposed in a gap area formed by the red pixel S10, the green pixel S20, and the blue pixel S30 to avoid blocking the light emitted by the red pixel S10, the green pixel S20 and the blue pixel S30.

Wherein, the barrier layer Z may be made of silicon nitride (SiNx) or may be made of other insulating materials.

The touch panel of the present technical solution comprises a plurality of spaced-apart first electrode chains and a plurality of spaced-apart second electrode chains, and the first electrode chain and the second electrode chain being cross-insulated, at least a conductive bridge, electrically connected to the first electrode chain, the conductive bridge extending into a contour region of the second electrode chain, and insulated from the second electrode chain. Because the conductive bridge and the first electrode chain are electrically connected, and the conductive bridge can be regarded as a part of the first electrode chain, and the conductive bridge extends into the contour region of the second electrode chain to increase the interaction area between the first electrode chain and the second electrode chain, thereby changing the mutual capacitance between the first electrode chain and the second electrode chain, and improving the sensitivity of touch detection.

In each of the first electrode chains 100, the plurality of first electrodes 110 are spaced apart, and two adjacent first electrodes 110 are electrically connected through a first connecting portion 1100. Preferably, in the same first electrode chain 100: the two adjacent first electrodes 110 can also be directly connected in point-to-point manner. In the present embodiment, the first connecting portion 1100 is integrally formed with the first electrode chain 100, and is fabricated by patterning with a mask, but the width of the first connecting portion 1100 is smaller than that of the first electrode chain 100.

In each of the second electrode chains 200, the plurality of second electrodes 210 are spaced apart, and two adjacent second electrodes 210 are electrically connected by a second connecting portion 1200. The second connecting portion 1200 has a W shape and is disposed at the gap area formed by the red pixel S10, the green pixel S20, and the blue pixel S30, to avoid blocking the light emitted by the red pixel S10, the green pixel S20 and the blue pixel S30.

Figure 2:
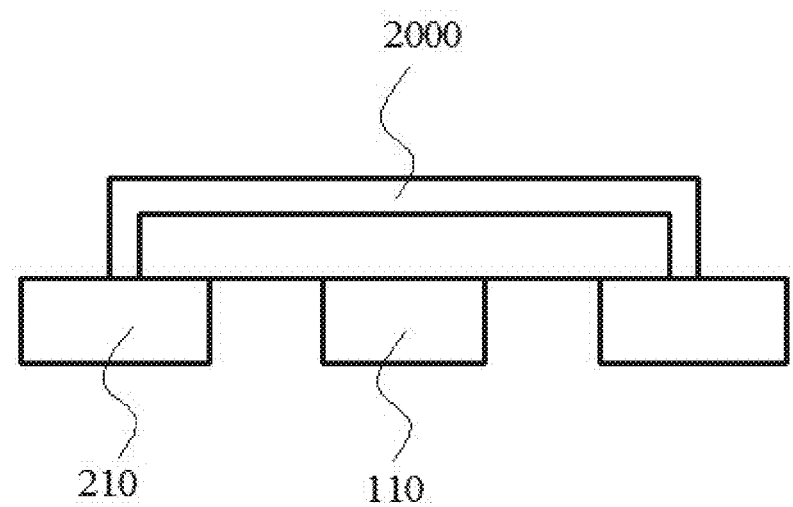
FIG. 2 is a schematic view showing the structure of the conductive bridge of the touch panel according to the first embodiment of the present invention.

Preferably, in the same second electrode chain 200, two adjacent second electrodes 210 may be connected by the bridge 2000, as shown in FIG. 2, and is also possible to be electrically connect through other structures, which is not limited in this application.

Optionally, the touch panel 10 comprises at least a conductive bridge 300 electrically connected to the first electrode chain 100, and the conductive bridge 300 extends into a contour region of the second electrode chain 200 and is insulated from the second electrode chain 200. The conductive bridge 300 has a square structure for improving the mutual capacitance between the first electrode chain 100 and the second electrode chain 200. Optionally, the number of the conductive bridges 300 may be one or plural. The number of the conductive bridges 300 is not limited in the present application.

Figure 3:
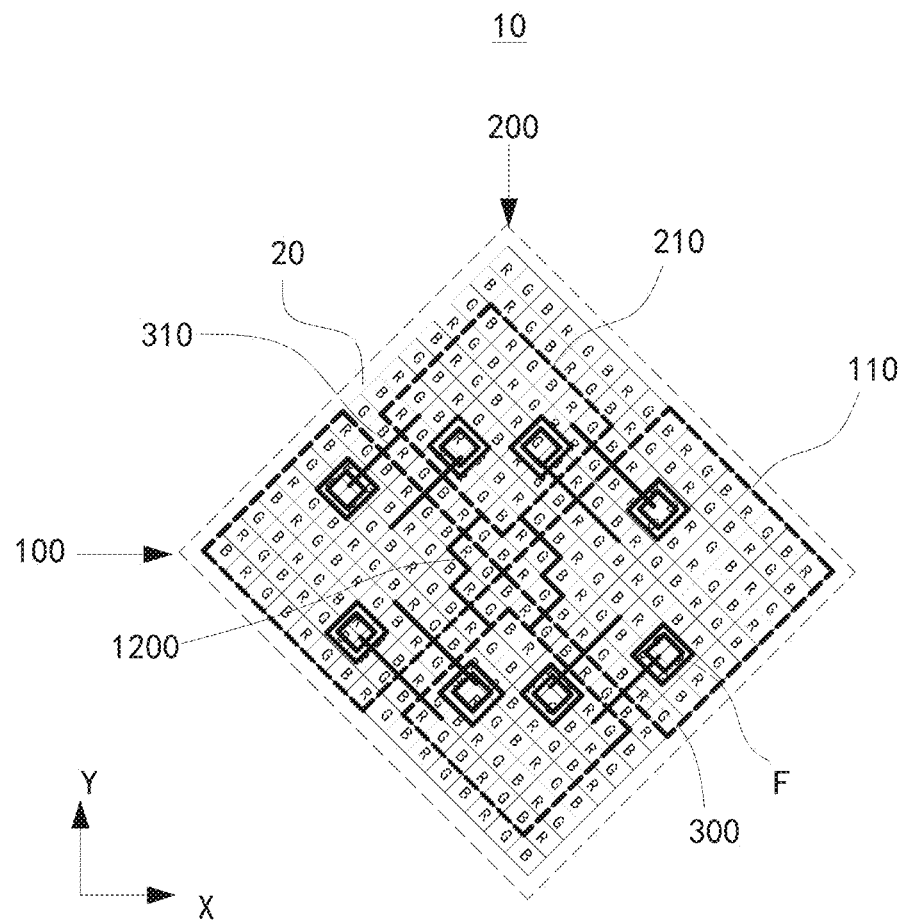
FIG. 3 is a schematic view showing the structure of the touch panel according to the second embodiment of the present invention.

Preferably, refer to FIG. 3, which is a schematic structural view of the touch panel according to the second embodiment of the present invention. The second embodiment has the same structure as the first embodiment, except that in the second embodiment, the touch panel 10 further comprises: another conductive bridge 310, the other conductive bridge 310 and the second electrode chain 200 are electrically connected, and the other conductive bridge 310 extends into a contour region of the first electrode chain 100 and is insulated from the first electrode chain 100. Optionally, the number of the other conductive bridges 310 may be one or plural, and the number of the other conductive bridges 310 is not limited by the present invention.

Figure 4:
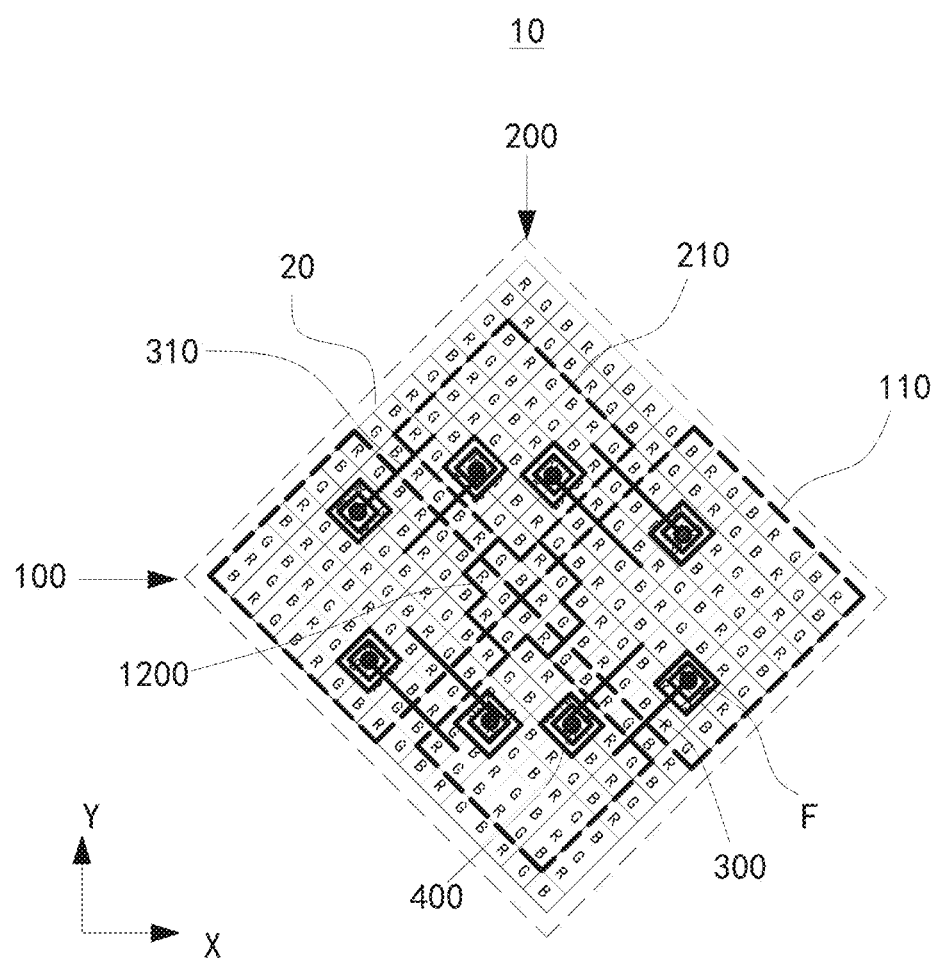
FIG. 4 is a schematic view showing the structure of the connection of the conductive bridge of the touch panel according to the first embodiment of the present invention.

Optionally, in an embodiment, the touch panel 10 further comprises:

at least an auxiliary electrode F, the first electrode chain 100 and the second electrode chain 200 are disposed in the same layer and are made of the same material, such as, formed by the same transparent conductive material or metal material layer, so that the auxiliary electrode F can be formed simultaneously by the same patterning process to simplify the process. An insulating layer (not shown) is disposed between the conductive bridge 300 and the first electrode chain 100 and the second electrode chain 200. The insulating layer is disposed with a via 400 corresponding to the first electrode. The auxiliary electrode F is disposed corresponding to the via 400, and the conductive bridge 300 is electrically connected to the first electrode 110 through the via 400. Refer to FIG. 4, which is a schematic view of a connection structure of a conductive bridge in a touch panel according to the first embodiment of the present invention.

Wherein, a metal material is disposed in the via 400, and the metal material is electrically connected to the auxiliary electrode F.

Optionally, in another embodiment, the first electrode chain 100 and the second electrode chain 200 are disposed in different layers, and the conductive bridge 300 and the first electrode chain 100 are disposed in the same layer and made of the same material. The first electrode chain 100 and the second electrode chain 200 are disposed in different layers. One of the first electrode chain 100 and the second electrode chain 200 is disposed on the first layer on the substrate as the conductive bridge 300, and may be made of the same material. The other of the first electrode chain 100 and the second electrode chain 200 is disposed in the second layer different from the first layer, so that the formation of the above-described bridge 2000 connection structure can be avoided.

Optionally, the conductive bridge 300 may be one or plural. The conductive bridge 300 may be electrically connected to the first electrode chain 100 or may be electrically connected to the second electrode chain 200. When the conductive bridge 300 is electrically connected to the first electrode chain 100, the conductive bridge 300 is to be insulated from the second electrode chain 200. Preferably, an insulating layer is provided between the conductive bridge 300 and the second electrode chain 200. In such case, the conductive bridge 300 extends into the contour region of the second electrode chain 200 and is insulated from the second electrode chain 200. When the conductive bridge 300 is electrically connected to the second electrode chain 200, the conductive bridge 300 is to be insulated from the first electrode chain 100. Preferably, an insulating layer is provided between the conductive bridge 300 and the first electrode chain 100. In such case, the conductive bridge 300 extends into the contour region of the first electrode chain 100 and is insulated from the first electrode chain 100.

Refer to FIGS. 5(a)-5(c). FIGS. 5(a)-5(c) are schematic views showing the structure of connecting portion of the touch panel according to a preferred embodiment of the present invention. The second electrode chain 200 forms a connecting portion 1000 with the first electrode chain 100. The connection portion 1000 comprises a first connecting portion 1100 and a second connecting portion 1200, and the first connecting portion 1100 and the second connecting portion 1200 are cross-insulated, and the first connecting portion 1100 is for connecting two adjacent first electrodes 110, and the second connecting portion 1200 is for connecting two adjacent second electrodes 210.

Wherein, since the connecting portion 1000 is generally made of a metal material, the connecting portion 1000 is disposed in a gap area formed by the red pixel S10, the green pixel S20, and the blue pixel S30 to avoid blocking the light emitted by the red pixel S10, the green pixel S20, and the blue pixel S30.

Figure 6:
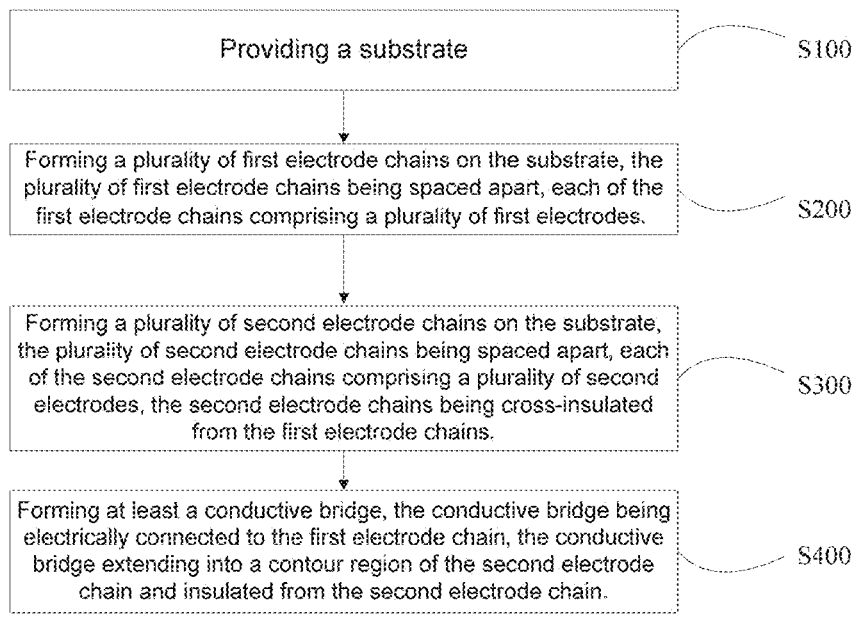
FIG. 6 is a schematic view showing the flowchart of the manufacturing method for touch panel according to an embodiment of the present invention.

Refer to FIG. 6. The present invention also provides a manufacturing method for touch panel. The manufacturing method for touch panel comprises, but is not limited to, steps S100, S200, S300 and S400. The detailed description of steps S100, S200, S300 and S400 is as follows.

S100: providing a substrate 20.

Wherein, the substrate 20 is a transparent substrate, such as, glass substrate or plastic substrate, and may be a flexible substrate.

S200: forming a plurality of first electrode chains 100 on the substrate 20, the plurality of first electrode chains 100 being spaced apart, each of the first electrode chains 100 comprising a plurality of first electrodes 110.

S300: forming a plurality of second electrode chains 200 on the substrate 20, the plurality of second electrode chains 200 being spaced apart, each of the second electrode chains 200 comprising a plurality of second electrodes 210, the second electrode chains 200 being cross-insulated from the first electrode chains 100.

Preferably, the first electrode chain 100 is a sensing electrode chain, and the second electrode chain 200 is a driving electrode chain. In such case, the first electrode 110 is a sensing electrode and the second electrode 210 is a driving electrode. Alternatively, the first electrode chain 100 is a driving electrode chain, and the second electrode chain 200 is a sensing electrode chain. In such case, the first electrode 110 is a driving electrode and the second electrode 210 is a sensing electrode.

Wherein, the first electrode 110 and/or the second electrode 210 have a block structure made of a transparent conductive material, and the first electrode 110 and/or the second electrode 210 are both made of metal, and the touch layer formed by the first electrode chain 100 and the second electrode chain 200 is a mesh structure. The first electrode 110 and/or the second electrode 210 may be formed into various shapes, such as, a rhombic shape, a square shape, a rectangular shape, and the like, which are not limited in the present invention. In a preferred embodiment, in a case where the first electrode 110 and the second electrode 210 have a rhombic shape or a square shape, the adjacent first electrodes 110 in each of the first electrode chains 100 are electrically connected to each other at the vertices of rhombic shape or square shape in a first direction, and the adjacent second electrodes 210 of each of the second electrode chains 200 are electrically connected to each other by a bridge 2000 at the vertices of the rhombic shape or the square shape in a second direction. The first direction may be the X direction or the Y direction; the second direction may be the Y direction or the X direction. When the first direction is the X direction, the second direction is the Y direction; when the first direction is the Y direction, the second direction is the X direction.

In each of the first electrode chains 100, the plurality of first electrodes 110 are spaced apart, and two adjacent first electrodes 110 are electrically connected through a first connecting portion 1100. Preferably, in the same first electrode chain 100: the two adjacent first electrodes 110 can also be directly connected in point-to-point manner. In the present embodiment, the first connecting portion 1100 is integrally formed with the first electrode chain 100, and is fabricated by patterning with a mask, but the width of the first connecting portion 1100 is smaller than that of the first electrode chain 100.

In each of the second electrode chains 200, the plurality of second electrodes 210 are spaced apart, and two adjacent second electrodes 210 are electrically connected by a second connecting portion 1200. Preferably, in the same second electrode chain 200, two adjacent second electrodes 210 may be connected by the bridge 2000, as shown in FIG. 2, and is also possible to be electrically connect through other structures, which is not limited in this application.

S400: forming at least a conductive bridge 300, the conductive bridge 300 being electrically connected to the first electrode chain 100, the conductive bridge 300 extending into a contour region of the second electrode chain 200 and insulated from the second electrode chain 200.

Optionally, the touch panel 10 comprises at least a conductive bridge 300 electrically connected to the first electrode chain 100, and the conductive bridge 300 extends into a contour region of the second electrode chain 200 and is insulated from the second electrode chain 200. The conductive bridge 300 has a square structure for improving the mutual capacitance between the first electrode chain 100 and the second electrode chain 200.

Specifically, the conductive bridge 300 extends into a contour region of the second electrode chain 200, wherein the contour region of the second electrode chain 200 is a three-dimensional region obtained by extending a boundary of the second electrode chain toward a direction perpendicular to a surface formed by the second electrode chain, which is the contour area of the second electrode chain 200. In the present embodiment, the conductive bridge 300 extends to the inside of the three-dimensional region.

Optionally, the conductive bridge 300 may be one or plural. The conductive bridge 300 may be electrically connected to the first electrode chain 100 or may be electrically connected to the second electrode chain 200. When the conductive bridge 300 is electrically connected to the first electrode chain 100, the conductive bridge 300 is to be insulated from the second electrode chain 200. Preferably, an insulating layer is provided between the conductive bridge 300 and the second electrode chain 200. In such case, the conductive bridge 300 extends into the contour region of the second electrode chain 200 and is insulated from the second electrode chain 200. When the conductive bridge 300 is electrically connected to the second electrode chain 200, the conductive bridge 300 is to be insulated from the first electrode chain 100. Preferably, an insulating layer is provided between the conductive bridge 300 and the first electrode chain 100. In such case, the conductive bridge 300 extends into the contour region of the first electrode chain 100 and is insulated from the first electrode chain 100.

The touch panel of the present technical solution comprises a plurality of spaced-apart first electrode chains and a plurality of spaced-apart second electrode chains, and the first electrode chain and the second electrode chain being cross-insulated, at least a conductive bridge, electrically connected to the first electrode chain, the conductive bridge extending into a contour region of the second electrode chain, and insulated from the second electrode chain. Because the conductive bridge and the first electrode chain are electrically connected, and the conductive bridge can be regarded as a part of the first electrode chain, and the conductive bridge extends into the contour region of the second electrode chain to increase the interaction area between the first electrode chain and the second electrode chain, thereby changing the mutual capacitance between the first electrode chain and the second electrode chain, and improving the sensitivity of touch detection.

Figure 7:
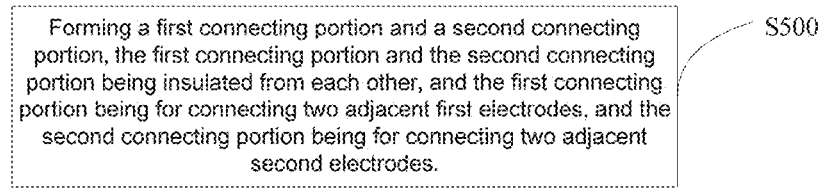
FIGS. 7-9 are schematic views showing a partial flowchart of the manufacturing method for touch panel according to an embodiment of the present invention.

Refer to FIG. 7. The manufacturing method for touch panel further comprises, but is not limited to, step S500. Step S500 is described as follows.

S500: forming a first connecting portion 1100 and a second connecting portion 1200, the first connecting portion 1100 and the second connecting portion 1200 being insulated from each other, and the first connecting portion 1100 being for connecting two adjacent first electrodes 110, and the second connecting portion 1200 being for connecting Two adjacent second electrodes 210.

Wherein, the second electrode chain 200 forms a connection portion 1000 at the intersection with the first electrode chain 100, and the connection portion 1000 comprises the first connecting portion 1100 and the second connecting portion 1200.

Optionally, the first connecting portion 1100 may be disposed in the same layer as the first electrode chain 100, and the first connecting portion 1100 may also be disposed in different layers from the first electrode chain 100. The second connecting portion 1200 may be disposed in the same layer as the second electrode chain 200, and the second connecting portion 1200 may also be disposed in a different layer from the second electrode chain 200. When the first connecting portion 1100 is disposed in the same layer as the first electrode chain 100, the first connecting portion 1100 and the first electrode chain 100 can be formed in the same step to save the process. When the second connecting portion 1200 is disposed in the same layer as the second electrode chain 200, the second connecting portion 1200 and the second electrode chain 200 may be formed in the same step to save the process. When the first electrode chain 100 and the second electrode chain 200 are disposed in the same layer, the first connecting portion 1100 and the second connecting portion 1200 are disposed in different layers, and the connection between the first connecting portion 1100 and the first electrode 110 may be through a via, the connection between the second connecting portion 1200 and the second electrode 210 may also be through a via. Furthermore, when the first connecting portion 1100 and the second connecting portion 1200 are disposed in different layers, an insulating layer is disposed between the first connecting portion 1100 and the second connecting portion 1200, to ensure insulation between the first connecting portion 1100 and the second connecting portion 1200 on one hand, and on the other hand, to form support for the first connecting portion 1100 and the second connecting portion 1200 to prevent the first connecting portion 1100 and the second connecting portion 1200 from damage, wherein the insulating layer may be made of SiNx or $Al_2O_3$.

Figure 8:
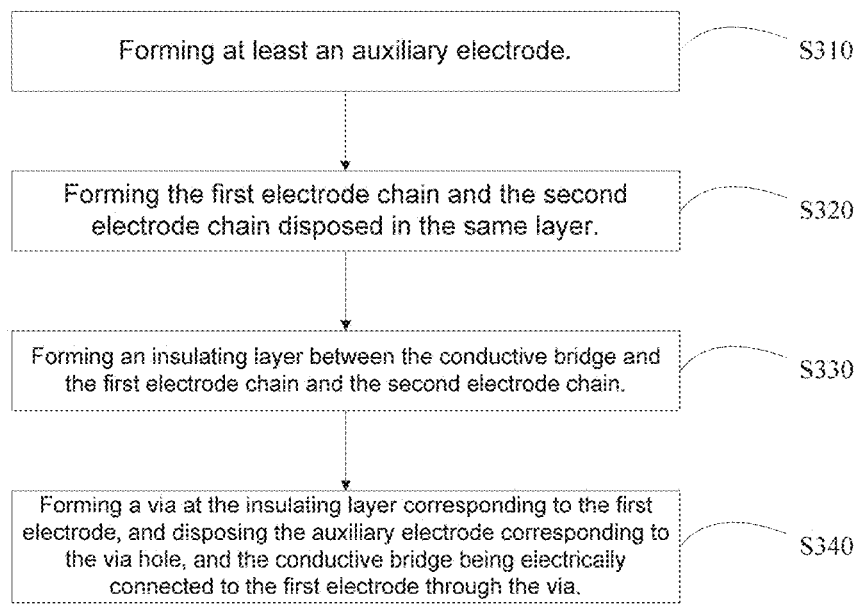

Refer to FIG. 8. In an embodiment, the manufacturing method for touch panel further comprises, but is not limited to, steps S310, S320, S330, and S340. Steps S310, S320, S330, and S340 are described as follows.

S310: forming at least an auxiliary electrode F;

S320: forming the first electrode chain 100 and the second electrode chain 200 disposed in the same layer.

Alternatively, in an embodiment, the first electrode chain 100 and the second electrode chain 200 are disposed in the same layer and are made of the same material, such as, by the same transparent conductive material or metal material layer so that the process is simplified to simultaneously form both in the same patterning process.

S330: forming an insulating layer between the conductive bridge 300 and the first electrode chain 100 and the second electrode chain 200.

Optionally, the insulating layer can ensure insulation between the first connecting portion 1100 and the second connecting portion 1200 on one hand, and on the other hand, to form support for the first connecting portion 1100 and the second connecting portion 1200 to prevent the first connecting portion 1100 and the second connecting portion 1200 from damage, wherein the insulating layer may be made of SiNx or $Al_2O_3$.

S340: forming a via 400 at the insulating layer corresponding to the first electrode 110, and disposing the auxiliary electrode F corresponding to the via hole, i.e., a vertical projection of the auxiliary electrode F on the insulating layer covering the area of the via 400, and the conductive bridge 300 being electrically connected to the first electrode 110 through the via 400.

Optionally, since the conductive bridge 300 and the first electrode 110 are disposed in different layers, to electrically connect the conductive bridge 300 to the first electrode 110, the via 400 is formed in the insulating layer corresponding to the first electrode 110 to facilitate electrical connection of the conductive bridge 300 to the first electrode 110 through the via 400.

Figure 9:
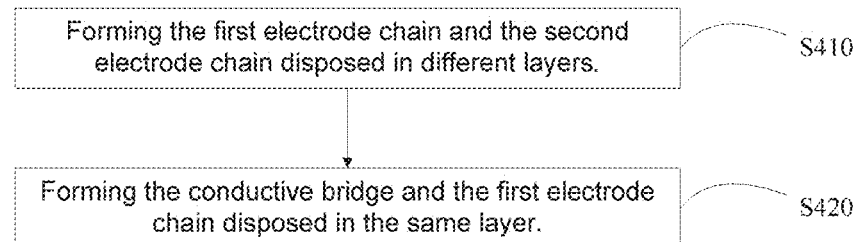

Refer to FIG. 9. In another embodiment, the manufacturing method for touch panel further comprises, but is not limited to, steps S410 and S420. Steps S410 and S420 are described as follows.

S410: forming the first electrode chain 100 and the second electrode chain 200 disposed in different layers.

S420: forming the conductive bridge 300 and the first electrode chain 100 disposed in the same layer.

Optionally, in another embodiment, the first electrode chain 100 and the second electrode chain 200 are disposed in different layers, and the conductive bridge 300 and the first electrode chain 100 are disposed in the same layer and made of the same material. The first electrode chain 100 and the second electrode chain 200 are disposed in different layers. One of the first electrode chain 100 and the second electrode chain 200 is disposed on the first layer of the substrate as the conductive bridge 300, and may be made of the same material, and the other of the first electrode chain 100 and the second electrode chain 200 is disposed in the second layer different from the first layer, so that the connecting structure of the above-described bridge 2000 can be avoided.

Figure 10:
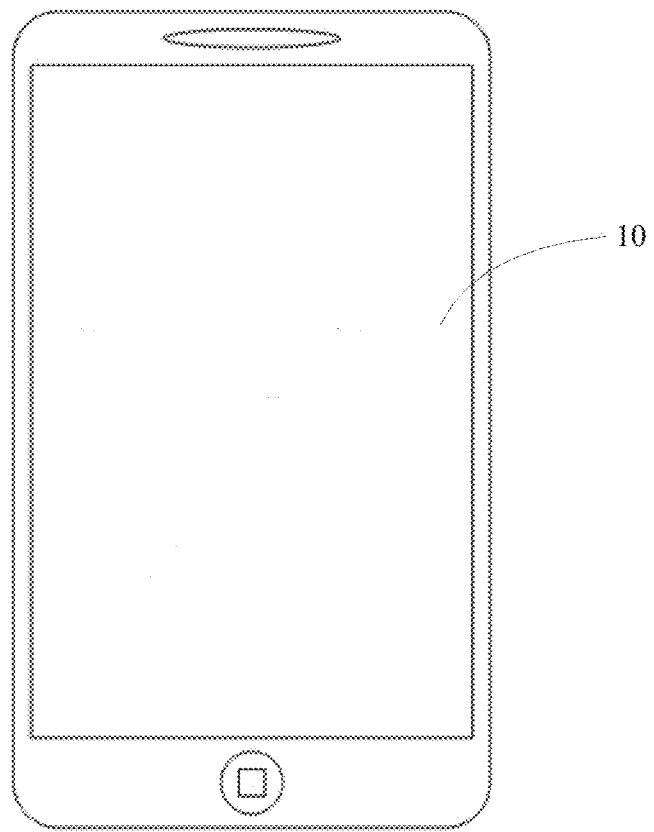
FIG. 10 is a schematic view showing the structure of the touch device according to a preferred embodiment of the present invention.

Refer to FIG. 10. FIG. 10 is a schematic view showing the structure of the touch device according to a preferred embodiment of the present invention. The touch device 1 comprises a touch panel 10, and the touch panel 10 may be the touch panel 10 provided in any of the preceding embodiments, and details are not described herein. The touch device 1 can be, but is not limited to, an e-book, a smart phone (such as an Android phone, an IOS phone, a Windows Phone, etc.), a tablet, a palmtop computer, a notebook computer, and a mobile Internet device (Mobile Internet Devices, MID) or wearable devices. The touch device can be an OLED touch device.

It should be noted that each of the embodiments in this specification is described in a progressive manner, each of which is primarily described in connection with other embodiments with emphasis on the difference parts, and the same or similar parts may be seen from each other. For the device embodiment, since it is substantially similar to the method embodiment, the description is relatively simple and the relevant description may be described in part of the method embodiment.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A touch panel, comprising:
   a substrate;
   a plurality of first electrode chains disposed on the substrate, spaced apart, each of the first electrode chains comprising a plurality of first electrodes;
   a plurality of second electrode chains disposed on the substrate, spaced apart, each of the second electrode chains comprising a plurality of second electrodes, the second electrode chains being cross-insulated from the first electrode chains;
   at least a conductive bridge, electrically connected to the first electrode chain, the conductive bridge extending into a contour region of the second electrode chain and insulated from the second electrode chain;
   wherein at least one additional conductive bridge is electrically connected to the second electrode chain and extends into a contour region of the first electrode chain and is insulated from the first electrode chain, such that each of the first and second electrode chains comprises at least one conductive bridge connected thereto and extending into a contour region of an opposite one of the first and second electrode chains.

2. The touch panel as claimed in claim 1, wherein a connecting portion is formed at intersection of the second electrode chain and the first electrode chain, the connecting portion comprises a first connecting portion and a second connecting portion, the first connecting portion and the second connecting portion are insulated from each other, and the first connecting portion is for connecting two adjacent first electrodes, and the second connecting portion is for connecting two adjacent second electrodes.

3. The touch panel as claimed in claim 2, further comprising:
   a barrier layer, disposed between the substrate and the first electrode chain, the second electrode chain;
   a pixel layer, disposed between the barrier layer and the substrate, the pixel layer comprising a red pixel, a green pixel and a blue pixel, the conductive bridge and the connecting portion being disposed in a gap area formed by the red pixel, the green pixel and the blue pixel to avoid blocking light emitted from the red pixel, the green pixel and the blue pixel.

4. The touch panel as claimed in claim 1, further comprising: at least an auxiliary electrode, the first electrode chain and the second electrode chain being disposed in the same layer; an insulating layer being disposed between the conductive bridge and the first electrode chain and the second electrode chain; the insulating layer being disposed with a via corresponding to the first electrode, the auxiliary electrode being disposed correspondingly to the via, and the conductive bridge being electrically connected to the first electrode through the via.

5. The touch panel as claimed in claim 4, wherein a metal material is disposed inside the via and is electrically connected to the auxiliary electrode.

6. The touch panel as claimed in claim 1, wherein the first electrode chain and the second electrode chain are disposed in different layers, and the conductive bridge and the first electrode chain are disposed in the same layer.

7. The touch panel as claimed in claim 1, wherein the first electrode chain is a sensing electrode chain and the second electrode is a driving electrode chain; or the first electrode chain is a driving electrode chain and the second electrode is a sensing electrode chain.

8. The touch panel as claimed in claim 1, wherein the first electrode chain and the second electrode chain are made of the same material.

9. A manufacturing method for touch device, comprising the steps of:
  providing a substrate;
  forming a plurality of first electrode chains on the substrate, spaced apart, each of the first electrode chains comprising a plurality of first electrodes;
  forming a plurality of second electrode chains on the substrate, spaced apart, each of the second electrode chains comprising a plurality of second electrodes, the second electrode chains being cross-insulated from the first electrode chains;
  forming at least a conductive bridge, the conductive bridge being electrically connected to the first electrode chain, the conductive bridge extending into a contour region of the second electrode chain and insulated from the second electrode chain;
  forming at least one additional conductive bridge, which is electrically connected to the second electrode chain and extends into a contour region of the first electrode chain and is insulated from the first electrode chain, such that each of the first and second electrode chains comprises at least one conductive bridge connected thereto and extending into a contour region of an opposite one of the first and second electrode chains.

10. The manufacturing method for touch panel as claimed in claim 9, wherein a connecting portion is formed at intersection of the second electrode chain and the first electrode chain, the connecting portion comprises a first connecting portion and a second connecting portion, the manufacturing method for touch panel further comprises:
  forming the first connecting portion and the second connecting portion, insulated from each other, and the first connecting portion being for connecting two adjacent first electrodes, and the second connecting portion being for connecting two adjacent second electrode.

11. The manufacturing method for touch panel as claimed in claim 9, further comprising:
  forming at least an auxiliary electrode;
  forming the first electrode chain and the second electrode chain disposed in the same layer;
  forming an insulating layer disposed between the conductive bridge and the first electrode chain, the second electrode chain;
  forming a via in the insulating layer corresponding to the first electrode, the auxiliary electrode being disposed correspondingly to the via, and the conductive bridge being electrically connected to the first electrode through the via.

12. The manufacturing method for touch panel as claimed in claim 9, further comprising:
  forming the first electrode chain and the second electrode chain disposed in different layers;
  forming the conductive bridge and the first electrode chain disposed in the same layer.

13. A touch device, comprising a touch panel, the touch panel comprising:
  a substrate;
  a plurality of first electrode chains disposed on the substrate, spaced apart, each of the first electrode chains comprising a plurality of first electrodes;
  a plurality of second electrode chains disposed on the substrate, spaced apart, each of the second electrode chains comprising a plurality of second electrodes, the second electrode chains being cross-insulated from the first electrode chains;
  at least a conductive bridge, electrically connected to the first electrode chain, the conductive bridge extending into a contour region of the second electrode chain and insulated from the second electrode chain;
  wherein at least one additional conductive bridge is electrically connected to the second electrode chain and extends into a contour region of the first electrode chain and is insulated from the first electrode chain, such that each of the first and second electrode chains comprises at least one conductive bridge connected thereto and extending into a contour region of an opposite one of the first and second electrode chains.

14. The touch device as claimed in claim 13, wherein a connecting portion is formed at intersection of the second electrode chain and the first electrode chain, the connecting portion comprises a first connecting portion and a second connecting portion, the first connecting portion and the second connecting portion are insulated from each other, and the first connecting portion is for connecting two adjacent first electrodes, and the second connecting portion is for connecting two adjacent second electrodes.

15. The touch device as claimed in claim 14, wherein the touch panel further comprises:
  a barrier layer, disposed between the substrate and the first electrode chain, the second electrode chain;
  a pixel layer, disposed between the barrier layer and the substrate, the pixel layer comprising a red pixel, a green pixel and a blue pixel, the conductive bridge and the connecting portion being disposed in a gap area formed by the red pixel, the green pixel and the blue pixel to avoid blocking light emitted from the red pixel, the green pixel and the blue pixel.

16. The touch device as claimed in claim 13, wherein the touch panel further comprises: at least an auxiliary electrode, the first electrode chain and the second electrode chain being disposed in the same layer and made of the same material; an insulating layer being disposed between the conductive bridge and the first electrode chain and the second electrode chain; the insulating layer being disposed with a via corresponding to the first electrode, the auxiliary electrode being disposed correspondingly to the via, and the conductive bridge being electrically connected to the first electrode through the via.

17. The touch device as claimed in claim 16, wherein a metal material is disposed inside the via and is electrically connected to the auxiliary electrode.

18. The touch device as claimed in claim 16, wherein the insulating layer is made of SiNx or $Al_2O_3$.

19. The touch device as claimed in claim 13, wherein the first electrode chain is a sensing electrode chain and the second electrode is a driving electrode chain; or the first electrode chain is a driving electrode chain and the second electrode is a sensing electrode chain.

20. The touch device as claimed in claim 13, wherein the first electrode chain and the second electrode chain are made of the same material.

* * * * *